United States Patent [19]

Spencer et al.

[11] Patent Number: 4,725,116
[45] Date of Patent: Feb. 16, 1988

[54] MULTIPLE PASS OPTICAL ROTARY JOINT

[75] Inventors: William W. Spencer, Waverley; John B. Oliver, Dartmouth, both of Canada

[73] Assignee: Nova Scotia Research Foundation Corp., Dartmouth, Canada

[21] Appl. No.: 776,716

[22] Filed: Sep. 16, 1985

[51] Int. Cl.[4] .............................................. G02B 6/36
[52] U.S. Cl. ............................ 350/96.20; 350/96.18; 350/486; 350/618
[58] Field of Search ............... 350/96.15, 96.16, 96.18, 350/96.19, 96.20, 96.21, 574, 623, 618, 486, 574, 569, 522

[56] References Cited

U.S. PATENT DOCUMENTS

| | | | |
|---|---|---|---|
| 4,175,832 | 11/1979 | Umeki et al. | 350/486 |
| 4,516,837 | 5/1985 | Soref et al. | 350/96.15 |
| 4,650,277 | 3/1987 | Husher et al. | 350/96.2 |

FOREIGN PATENT DOCUMENTS 1158466 12/1983 Canada .
60-17408 1/1985 Japan ................................. 350/96.20
2091899A 8/1982 United Kingdom .

*Primary Examiner*—John Lee
*Assistant Examiner*—John Ngo
*Attorney, Agent, or Firm*—Jones, Tullar and Cooper

[57] ABSTRACT

The invention relates to a multiple pass optical rotary joint which can simultaneously transmit optical signals along two or more channels in either of two directions. The joint uses a rotor and a stator to each of which is connected a plurality of optical fibers. Within the joint reflecting mirrors are used to redirect off-axis optical signals onto the joint axis, with relative rotation occurring while the signals are on-axis. A rotating member for each channel has a mirror for reflecting the on-axis signal portion off-axis to a receptor fiber. Alignment between the rotating member and the receptor fiber, as well as drive for the rotating member, is provided by a pair of magnets of opposite polarity, one being secured to the rotating member and the other being secured to the rotor. The magnetic interaction ensures synchronous rotation of the rotor and the rotating member. Specific embodiments in which transmission losses can be minimized are also disclosed.

33 Claims, 9 Drawing Figures

MULTIPLE PASS OPTICAL ROTARY JOINT

This invention relates to an optical rotary joint or slip ring and in particular to an optical rotary joint capable of transmitting a plurality of optical channels.

BACKGROUND OF THE INVENTION

Canadian Patent. No. 1,158,466 issued Dec. 13, 1983 to Litton Systems, Inc. discloses an optical slip ring which uses a pair of axially spaced apart graded index rod lens to effect efficient optical coupling between a pair of relatively rotating optic fibers. In the structure of the patent one lens is mounted in a stator and is connected to one optic fiber while the other lens is mounted in a rotor and is connected to the other optic fiber. A small gap separates the rotor and stator lenses. The lenses used are SELFOC (trademark) lenses, available from NSG America, Inc. of Clark, N.J., U.S.A.

Optical fibers are relatively fragile and care must be taken with a single channel rotary joint to avoid breakage of the fibers used. It is desirable to be able to reduce the concerns respecting breakage especially where either the environment is inhospitable to the equipment or the joint is relatively inaccessible when in use, as for example when it might be used in undersea applications.

SUMMARY OF THE INVENTION

The present invention overcomes the problems of the prior art by providing optical rotary joints which are capable of transmitting two or more channels of optical signals. Such a joint provides two distinct advantages over a single channel joint: there is redundancy in the circuitry and there is an expanded transmission capacity.

In order to achieve efficient optical coupling, each fiber optic link should have the relative rotation therein take place on the axis of the joint. If the first coupling takes place on axis then any other channel carried by the joint will have to enter and leave the joint off axis. The problem, solved by the present invention, is to redirect the light beams within the joint to bring them to the axis of rotation, make the couplings with relative rotation, on axis, and then redirect the light beams off axis again.

The present invention solves the problems mentioned above by using a plurality of appropriated angled mirrors or prisms within the joint to redirect a light beam from an off-axis path to an on-axis path. A part of the joint is held stationary relative to a rotatable part, both parts housing mirrors or prisms which redirect the beam through 90° on to and then off from the joint axis. Relative rotation takes place while the beam is on-axis and thus efficient coupling can take place.

In order to keep the off-axis beam leaving or entering the rotatable part in alignment with a corresponding fiber on the joint rotor, to ensure proper transmission, the rotatable part and the rotor are provided with magnets which interact to ensure that the rotatable part rotates in synchronism with the rotor itself. The magnetic field, which provides driving and aligning forces will allow the passage of light, without interruption, through full rotation.

Desirably, the present invention uses graded index rod lenses, such as SELFOC lenses to provide an enlarged, roughly parallel beam of light within the joint. That beam is more easily manipulated by the mirrors used to reflect the signal on to and off the axis of the joint.

An important feature is that the rotary joint of the present invention is bi-directional. Light may travel in either direction through each fiber and its rotational interface. In fact the joint itself may be operated in a bi-directional mode, with light travelling in one direction through one set of fibers at the same time as light travels in the opposite direction through another set of fibers.

In summary of the above, therefore, the present invention may be broadly considered to provide a multiple pass optical rotary joint comprising a rotor and a stator each including a head end and a tail end with the rotor head and tail ends being bearingly supported by the stator head and tail ends respectively; an annular body connecting the rotor head and tail ends together and means including transparent annular tube means connecting the stator head and tail ends together, the annular body circumferentially surrounding the connecting means; first means connecting a plurality of first optical fiber means to the stator; second means connecting a plurality of corresponding second optical fiber means to the rotor; means establishing an optical signal path between each of the first fiber means and the corresponding one of the second fiber means, a portion of each optical signal path extending along the axis of the joint; rotatable optical signal reflecting means bearingly supported within the stator for reflecting at least one optical signal between axial and non-axial portions of its path for eventual reception by an appropriate one of the fiber means; and first and second magnet means secured to the reflecting means and to the rotor, respectively, the magnet means being of opposite polarities, whereby as the rotor rotates magnetic interaction between the first and second magnet means effects synchronous rotation of the reflecting means with the rotor and maintains intact the relative angular orientation between the reflecting means and the appropriate one of the second fiber means.

DESCRIPTION OF THE PREFERRED EMBODIMENTS

Figure 1:
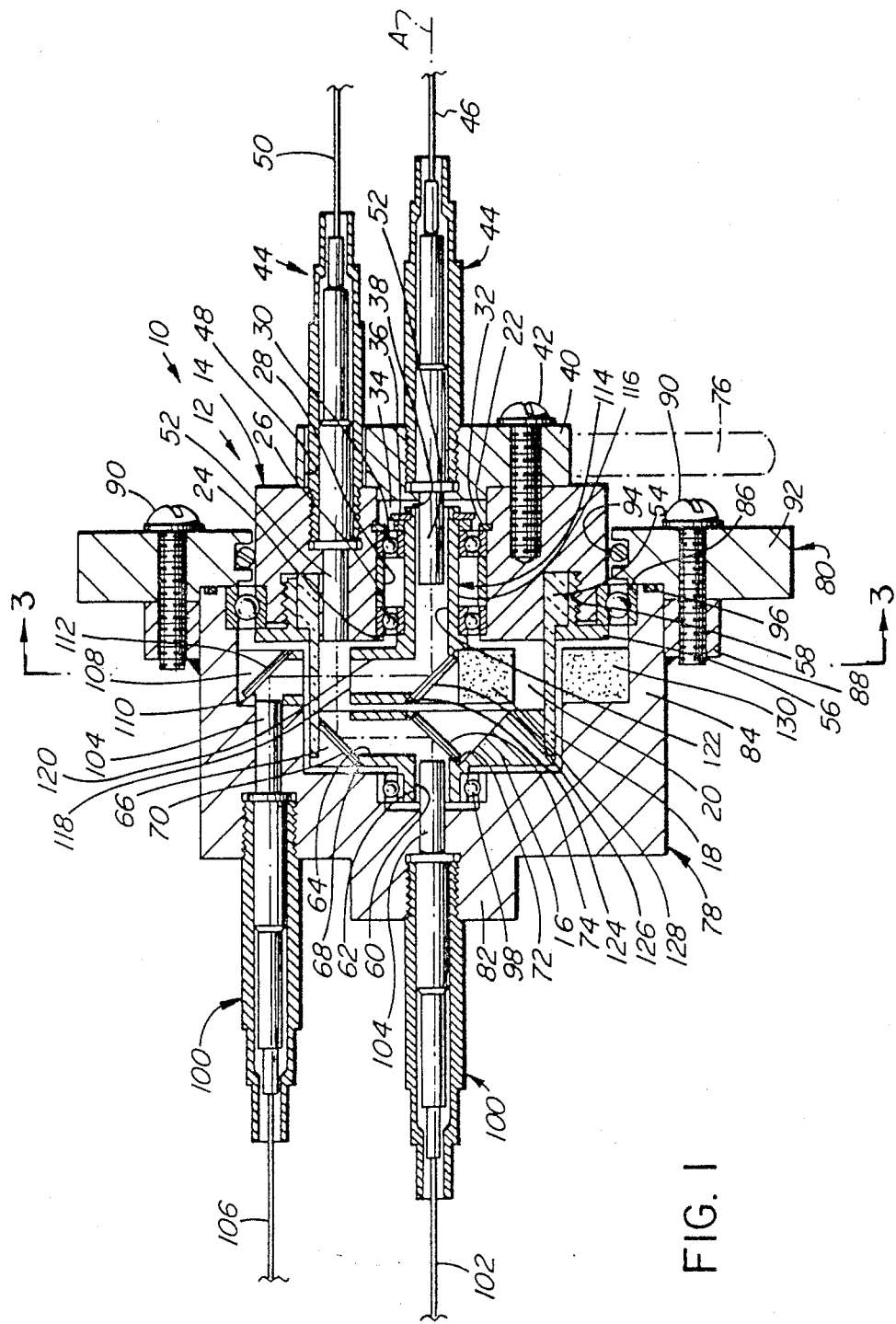
FIG. 1 illustrates a first embodiment of a multiple pass optical rotary joint according to the present invention in partial axial section.
Figure 2:
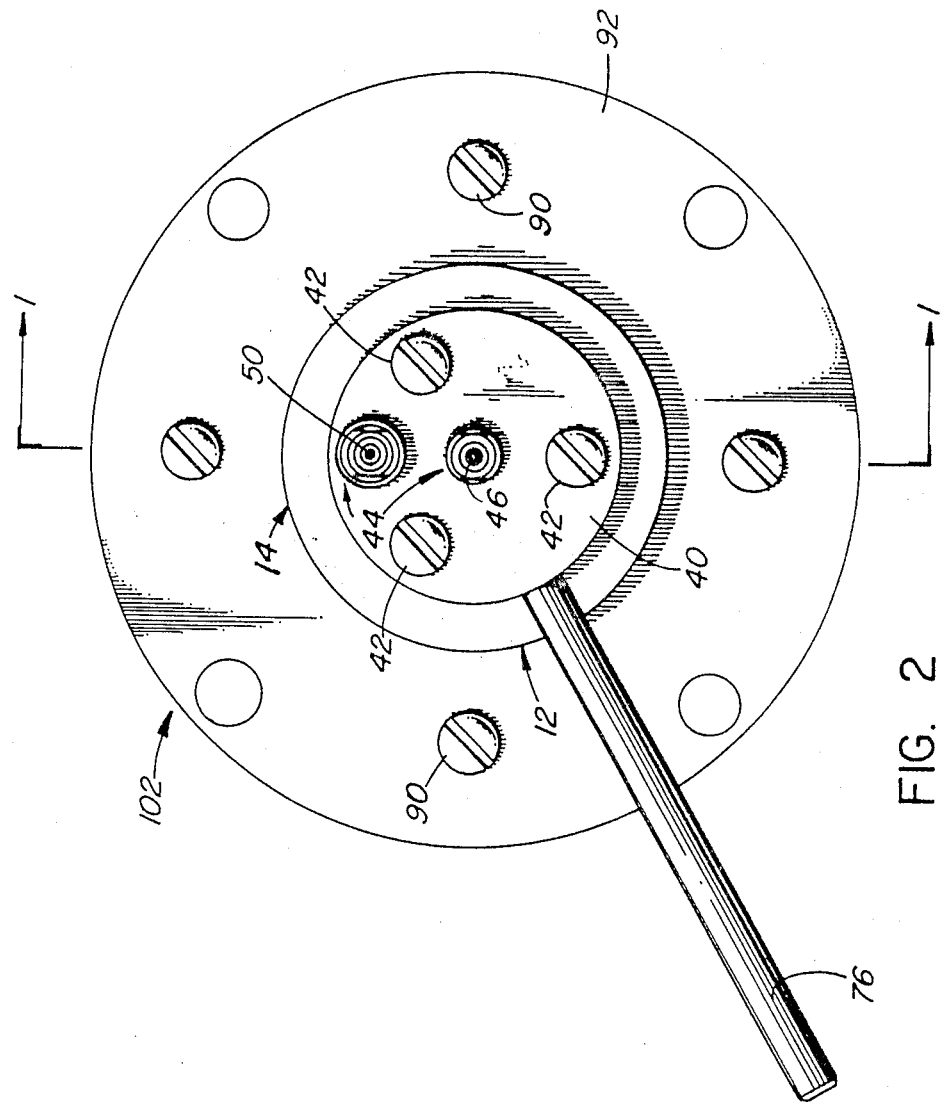
FIG. 2 illustrates an end view of the joint of FIG. 1.

FIGS. 1 and 2 illustrate a basic two-channel or two-pass optical slip joint 10 wherein the optical signal paths through the joint are essentially equal in length to ensure that the losses associated with each path are generally equal, thereby ensuring equal signal strength for each path. The joint includes a stator 12 having a head end 14, a tail end 16 and an optically transparent annular tube 18 connecting the head end to the tail end and defining a stator cavity 20 within the stator 12. The head end 14 is cylindrical and includes a support means including a central bore 22 which terminates at its inner end at a radially inwardly directed flange 24. Within the bore 22 is mounted a first bearing assembly 26, an annular spacer member 28, a second bearing assembly 30 and an annular retainer such as a circlip 32 which projects into space 34. A spacer member 36 butts against the bearing assembly 30 and an external circlip 38 positioned on a rotatable reflecting unit 114, to be described hereinafter.

A retaining cap member 40 is fastened to the head end 14 as by threaded bolts 42. The cap member 40 also is provided with conventional means 44 for securing thereto a first axially oriented optical fiber 46. The means for securing the fiber to the cap member need not be described in detail as it does not form a part of the present invention.

The cap member includes a through bore 48 spaced radially outwardly from the joint axis "A" through which passes another conventional means 44 used to secure another first optical fiber 50 to the head end of the stator. As seen from FIG. 1 there is an axial displacement between the two fibers 46 and 50, the purpose of which will become apparent hereinafter.

In the preferred form of this embodiment each fiber terminates in a graded index rod lens 52 such as a SEL-FOC (trademark) lens to provide an enlarged, roughly parallel beam of light which improves the ease of coupling optical inputs and outputs.

As illustrated, the transparent tube, whether of glass or plastic, is provided with a radially enlarged flange 54 at one end and a threaded retainer 56, when engaged with a threaded portion of an annular recess 58 of the head end will abut the flange 54 to securely connect the tube 18 to the head end 14.

At its opposite end the tube 18 mounts the tail end 16 of the stator. The tail end is generally cylindrical and may be sealingly bonded to the tube 18 so that it is non-rotatably secured thereto. The tail end 16 includes a central boss 60 defining an axial bore 62 therethrough, a radial bore 64 which intersects the axial bore 62 and an axially directed bore 66 which passes through the tail end and intersects the radial bore 64. At the backside of the bores 64 and 66 a seat 68 is machined to which is adhered a reflecting mirror 70 which is positioned at an angle of 45° to the axis of the stator so as to reflect a beam of light from a path along the bore 66 through 90° to a path along bore 64 (or vice versa). At the intersection of bores 62 and 64 another seat 72 is machined to which is adhered a reflecting mirror 74. The seats 68 and 72 are carefully machined so that the mirrors 70 and 74 are exactly parallel to each other. Mirror 74 serves to reflect a beam of light from a path along bore 64 through 90° to a path along bore 62 (or vice versa). As shown in FIG. 1 the bore 66 of the stator tail end 16 is aligned with the axis of fiber 50 so that a collimated beam of light emitted from the lens 52 will be reflected by the mirrors 70 and 74 on to the axis of the stator at the tail end of the stator.

Finally, it is noted that the stator 12 is provided with an arm or dog member 76 which can be secured to any appropriate locking means in the apparatus in which the rotary joint is to be used so as to hold the stator 12 against rotation.

The joint 10 also includes a rotor 78 which comprises a head end 80, a tail end 82 and an annular body 84 connecting the head end to the tail end. The head end 80 is annular and of larger diameter than the stator head end 14. Rotary bearings 86 received in corresponding recesses in the rotor and stator head ends bearingly support the rotor head end on the stator head end and a circumferential flange 88 welded to the rotor head end will accept threaded fasteners 90 which secure a cap member 92 to the flange 88. The cap member and the end face adjacent the bearing 86 define annular pockets for the reception of o-rings 94, 96 respectively which serve to seal the interior of the joint from the ambient environment.

At the tail end 82 of the rotor it is seen that the interior wall is stepped so that it conforms generally to the contours of the stator. The rotor tail end 82 and the boss 60 on the stator tail end 16 include corresponding recesses in which rotary bearings 98 are mounted so as to bearingly support the rotor tail end on the stator tail end.

The end wall of the rotor tail end 82 is provided with a central axial bore which, in a conventional manner receives means 100 which mounts to the rotor tail end a second axially oriented optical fiber 102. The fiber 102 terminates in a graded index rod lens 104 which is identical (has the same focal length) as the lens 52. As seen in FIG. 1 the lens 104 projects into the bore 62 in the boss 60 of the stator tail end and is positioned on the axis of the joint.

Spaced radially from the axis A is another bore in the tail end which receives a conventional mounting means 100 by which another second optical fiber 106 is secured to the tail end of the rotor. Fiber 106 also terminates in a graded index rod lens 104 the end of which is axially displaced from the other lens 104 by the same distance separating the ends of the rod lenses 52.

The tip of the lens 104 on fiber 106 projects slightly into a cavity 108 in which there is a seat 110 machined at 45° to the optical axis of lens 104, on which seat there is adhered a reflecting mirror 112. The mirror 112 will reflect a collimated beam of light from a path along the optical axis of the adjacent lens 104 through 90° to a path which is in a plane transverse to the axis A of the joint (and vice versa).

Within the interior of the stator a bearing or reflecting unit 114 is provided. The unit 114 includes a pair of mutually perpendicular sections, one of which (116) is cylindrical and is rotatably supported by bearing assemblies 26 and 30 within the central bore 22 of the stator head end. The other section 118 is also cylindrical, of larger diameter but of shorter length and is provided with a radially extending bore 120 the axis of which lies in the same transverse plane as the path of a beam reflected by the mirror 112. The section 116 is provided with an axially extending bore 122 which has its axis aligned with the axis A of the joint 10. The bores 120, 122 meet at the apex of the reflecting unit 114 whereat a seat 124 is machined to which is adhered a reflecting mirror 126 at an angle of 45° to the central axis of each bore 120, 122.

The reflecting unit 114 has secured thereto a first permanent magnet 128 of a specific polarity. The magnet is desirably positioned directly opposite the outlet from the radial bore 120. A second magnet 130 is secured to the rotor 78 adjacent the tube 18 of the stator and desirably diametrically opposite the mirror 112.

The magnet 130 is of a polarlity opposite to that of the magnet 128.

The operation of the rotary joint of this invention will now be described with reference to FIG. 1, it being assumed that the stator 12 is held stationary and that separate collimated optical signals are being transmitted along the first fibers 46 and 50 and that they are to be passed to the second fibers 102, 106 during rotation of the rotor 78.

As the rotor 78 rotates about the stator on the bearings 86 and 98 there will be a strong magnetic interaction between the magnets 128 and 130 and consequently the reflecting unit 114 will rotate on its bearing assemblies 26,30 in synchronism with the rotor 78. Through the magnetic interaction and the consequent synchronous rotation the optical axis of the reflecting unit bore 120 will be maintained in strict alignment with the optical axis defined by the reflecting mirror 112 and any optical signal reflected by the mirror 126 will in turn be reflected by the mirror 112 for capture by the lens 104 adjacent thereto. Thus, the optical signal from the fiber 46 is enlarged by the lens 52, travels along the axis of the joint (along bore 122), is reflected by the mirror 126, is reflected by the mirror 112, is captured by the lens 104 and is reduced thereby for transmission along the fiber 106.

Since the head and tail ends of the stator are fixed relative to each other a signal from the fiber 50 is enlarged by its lens 52, is reflected by mirror 70, and is reflected by the mirror 74 to the axis of the joint, is captured by the on-axis lens 104 and is reduced thereby for transmission along the fiber 102.

The construction according to this embodiment provides for the transmission of two separate optical signals through a rotary joint. As seen, a portion of each optical signal path is coincident with the joint axis and, due to the relatively staggered positioning of the lenses 52, 52 and 104,104 the lengths of the two optical paths are essentially identical. Accordingly transmission losses will be about the same for each path. In other words the signal strength will not vary appreciably from one path to the other. By using the lenses 52,104 the optical signal transmitted through the stator is enlarged to improve coupling between the input and output fibers. Even though the beam transmitted through the stator is enlarged there is essentially no detrimental effect when the beams momentarily cross during rotation.

The use of the seals 94 and 96 ensures that the interior of the joint is free of contamination and also permits the use of optical fluids or gases within the joint interior. Only slight enlargement of the rotor body would be required to effect pressure compensation of the joint, as might be required for oceanographic use.

In the just-described embodiment the magnets 128, 130 are shown as being diametrically opposite each other and as radially aligned with the optical path between mirrors 112 and 126. In fact, the positioning of the magnets is somewhat arbitrary as long as the mirrors 112 and 126 are maintained in two perfectly parallel planes at 45° to the axis A at all times.

Figure 3:
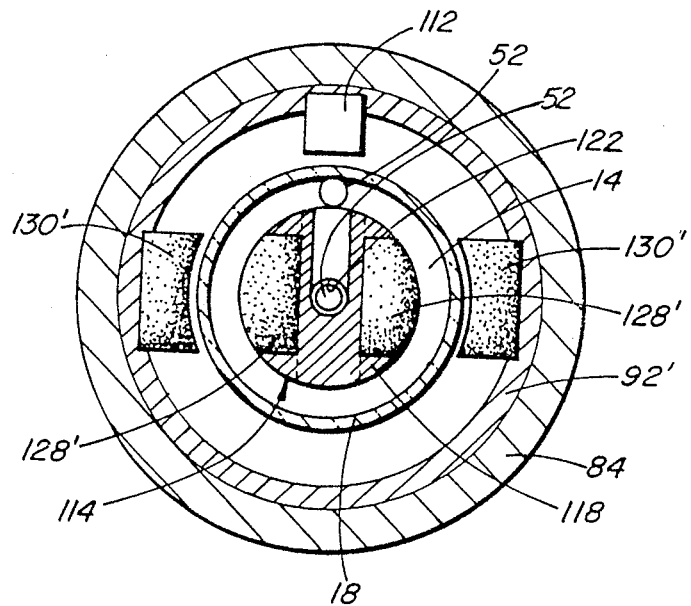
FIGS. 3 and 4 show sections along the line 3—3 of FIG. 1 depictinq alternative magnet arrangements.
Figure 4:
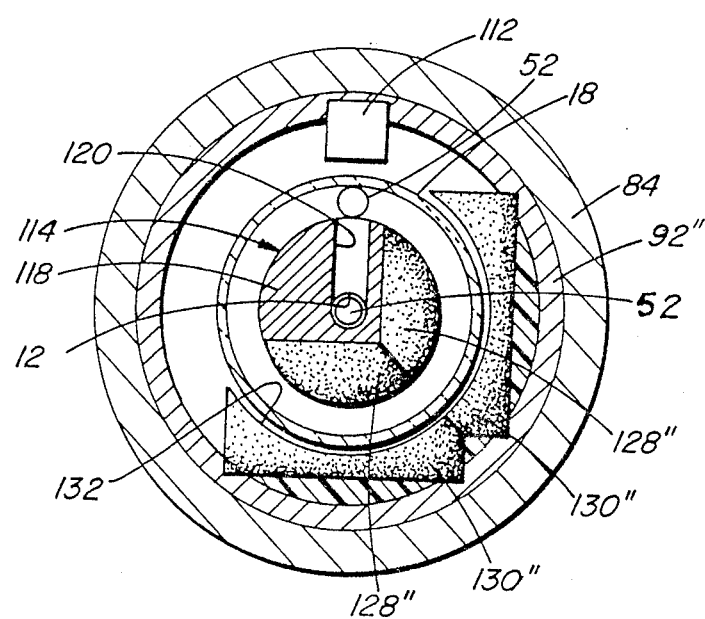

FIGS. 3 and 4 show two alternative magnet arrangements used to achieve synchronous rotation of the reflecting unit 114 with the rotor. In FIG. 3 a pair of first magnets 128' of opposite polarity is secured to the reflecting unit 114 on opposite sides of the bore 120, symmetrically positioned relative to the joint axis. In this instance the reflecting unit 114 would have to be magnetically conductive to complete the magnetic circuit.

A pair of second magnets 130' is secured to the rotor body 84 via a magnetically conductive ring 92', generally opposite the magnets 128', with each magnet pair 128', 130' having opposite polarity. Operation of this embodiment is identical to that of the first embodiment.

In FIG. 4 a pair of first magnets 128" is secured to the reflecting unit 114 in two adjacent quadrants thereof, the magnets being of opposite polarity and touching each other to complete the magnetic circuit. One of the magnets may be opposite the outlet to the bore 120. A pair of second magnets 130", touching each other to complete the magnetic circuit is secured to the interior of the rotor body 84 via ring 92" in such a manner that the continuous inner circular surface 132 thereof may cover about 50% of the circumference of the tube 18. The two magnets 130" are of opposite polarity as are the magnets 128", 130" of each magnet pair. Again operation of this embodiment is identical to that of the first embodiment.

Figure 5:
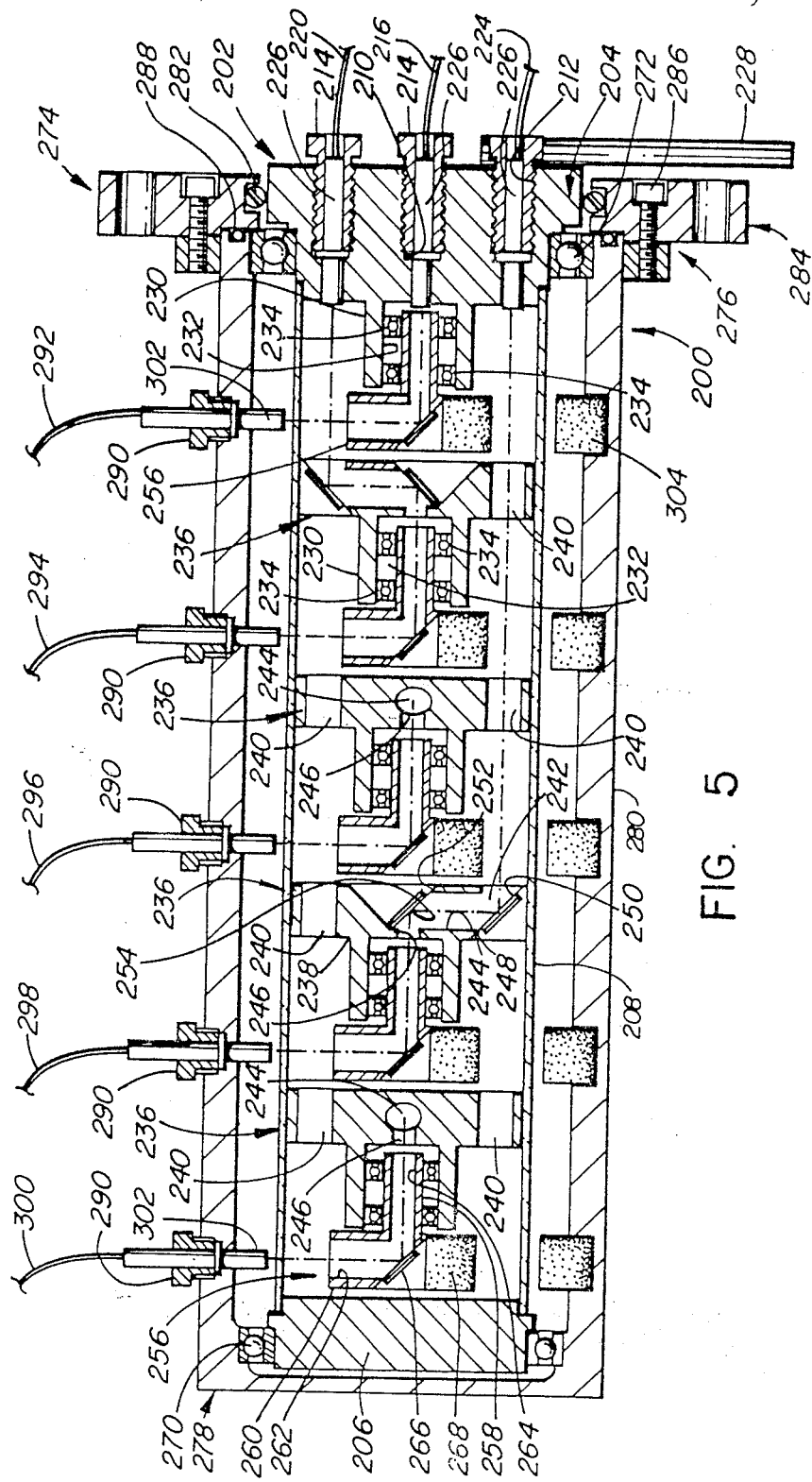
FIG. 5 illustrates a second embodiment in partial axial section of a multiple pass optical rotary joint in accordance with the present invention.
Figure 6:
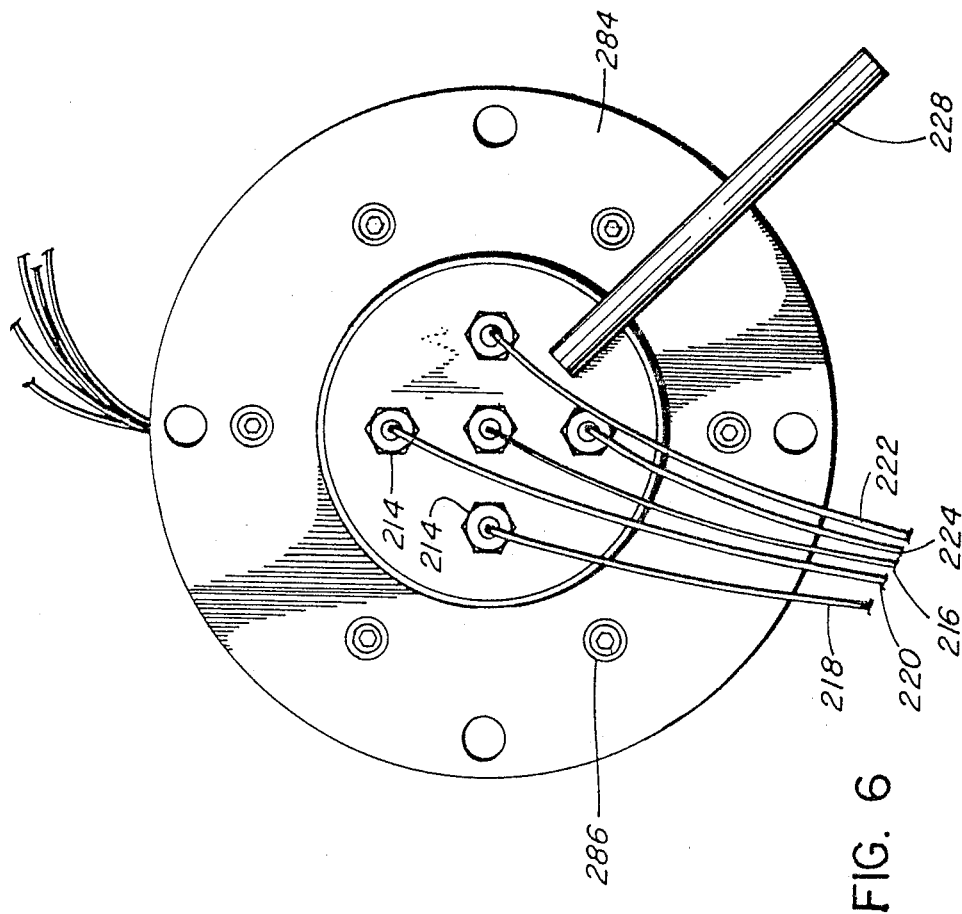
FIG. 6 illustrates an end view of the joint of FIG. 5.

Turning now to FIGS. 5 and 6 another embodiment of the invention will be described. This particular embodiment is shown with five optical inputs and outputs although it should be understood that the structure could be altered to accommodate any number of input and output channels, the only constraint being the degree of transmission loss that can be tolerated. The principle of operation is essentially the same as that described for the first embodiment although the execution of those principles differs somewhat from that first embodiment.

The joint 200 of this embodiment includes a stator 202 having a head end 204, a tail end 206 and an annular optically transparent tube 208 connecting the head end to the tail end. The head end is cylindrical and includes a central bore 210 as well as circumferentially spaced bores 212 each of which is adapted to receive conventional means 214 by which an optical signal carrying fiber is connected to the head end. The connection need not be described as it is conventional in nature and does not form a part of the invention. In the disclosed embodiment the joint accommodates five fibers designated 216, 218, 220, 222, and 224. Each fiber terminates at a graded index rod lens 226 such as a SELFOC (trademark) lens which serves to enlarge the diameter of an optical signal leaving the lens or to reduce the diameter of an optical signal entering the lens. As with the first embodiment an arm or dog member 228 is provided and it can be secured to any appropriate means in the apparatus in which the rotary joint is to be used so as to hold the stator against rotation.

On its rear side the head end 204 defines a supporting means which includes a boss 230 having a large diameter bore 232 which in turn communicates with the central bore 210 in the head end. In fact the lens 226 attached to the central fiber 216 protrudes slightly into the bore 232. A pair of axially spaced apart bearing assemblies 234 is secured within the bore 232 for a purpose to be described hereinafter.

Spaced apart along and non-rotatably secured to the transparent tube 208 is a plurality (four being shown) of separate supporting means or units 236. Since they are identical to each other only one will be described.

Each unit 236 is cylindrical and includes a large diameter portion 238 through which three circumferentially spaced bores 240 pass, the bores 240 being alignable with the bores 212 through the head end of the stator. Each unit includes a fourth through bore 242 which intersects a radially directed bore 244, the latter in turn intersecting a short bore 246 which enters the portion 238 from the rear surface thereof on the axis of the joint. At the intersection of the bores 242 and 244 a seat 248 is machined so as to receive a reflecting mirror 250 which is positioned at 45° to an axially directed optical path and to a radially directed optical path. At the intersection of the bores 244 and 246 another seat 252 is machined so as to receive a reflecting mirror 254 which is parallel to the mirror 250.

As seen in FIG. 5 the supporting unit 236 closest to the head end is oriented and secured within the tube 208 so that its bore 242 and mirror 250 are on a line to intercept an optical signal directed from the fiber 220. Since the other three bores 240 passing through the unit 236 are unimpeded, optical signals directed to or from the fibers 218, 222 and 224 will pass through appropriate ones of the bores 240. The next adjacent unit 236 is oriented at 90° to the just-described unit so that an optical signal directed from the fiber 222 will be intercepted by its mirror 250, the signals from the remaining two fibers 218 and 224 continuing through the unimpeded bores 240. The next adjacent unit 236 is oriented at 90° to the previous unit (180° to the unit closest to the head end) so that an optical signal directed from the fiber 224, having passed through both preceding support units is intercepted by its mirror 250. The optical signal directed from the remaining fiber 218 will be intercepted by the mirror 250 of the rearmost support unit 236, that unit being oriented at 90° to the preceding unit.

In each case the signal from one of the fibers 218, 220, 222 or 224 is reflected by a mirror 250 in a corresponding support unit from a path which is parallel to the joint axis to a path which is normal or transverse thereto. In each instance such reflected signal is again reflected through 90° so as to be on-axis by the mirror 254 in the corresponding support unit.

Each support unit includes a central boss 230, a central bore 232 therein communicating with the bore 246, and bearing assemblies 234 secured within the bore 232. Each support unit in turn carries a reflecting unit 256 which is substantially identical in construction to the reflecting unit 114 described with respect to the first embodiment. Thus each reflecting unit includes a cylindrical section 258, a section 260 at right angles thereto, radial and axial bores 262 and 264, a reflecting mirror 266 and a permanent magnet 268. Each reflecting unit 256 is rotatably supported by the bearing assemblies included in the corresponding support unit, there being one reflecting unit for each support unit, including the support unit formed at the back side of the stator head end.

The tail end 206 of the stator is cylindrical in nature and is secured to the transparent tube 208 in any conventional manner. A bearing assembly 270 is mounted on the stator tail end 206 and, similarly, a bearing assembly 272 is mounted on the stator head end 204.

The rotary joint of this embodiment includes a rotor 274 which has a head end 276, a tail end 278 and an annular body 280 connecting the head end 276 to the tail end 278. As with the first embodiment the rotor head end is bearingly supported on the stator head end by the bearing assembly 272 and the rotor tail end is bearingly supported on the stator tail end by the bearing assembly 270, the annular body 280 surrounding the transparent tube 208. In order to seal the interior of the joint 200 an o-ring seal 282 of conventional construction is provided in the rotor cap member 284 for sealing engagement with the stator head end. The cap member 284 is connected to the rotor head end 276 by machine screws 286 and is sealed thereto by conventional o-ring 288.

The rotor annular body has a plurality (five in this case) of aligned optical signal carrying fiber members connected thereto in conventional fashion by connecting means 290. From head end to tail end the rotor fibers are identified by reference numbers 292, 294, 296, 298 and 300. Each fiber terminates in a graded index rod lens 302 having the same focal length as the rod lenses 226. Each lens 302 projects through the annular body so as to be closely adjacent the transparent tube 208. The optical axis of each fiber and its lens coincides with a transverse plane containing the optical path defined in the bore 262 of a corresponding reflecting unit 256.

Diametrically opposite each fiber and its lens the rotor annular body 280 carries a permanent magnet 304 of a polarity opposite that of a corresponding magnet 268 carried by reflecting unit 256.

The principle of operation of the optical rotary joint 200 is essentially the same as for the joint 10 previously described. Optical signals entering the stator fibers are transmitted to the rotor fibers via optical paths that include rotatable reflecting members, which members serve to transmit an optical signal from the axis of the joint to the rotating rotor fibers, the reflecting members being driven, and maintained in alignment with the rotor fibers, by the magnetic interaction between the magnet pairs 304,268.

In describing the structure of the stator 202 it was pointed out that an optical signal emanating from each of the stator fibers 216-224 will pass into the stator and will include a portion which passes from a corresponding support unit along the axis of the joint. That portion is reflected by the mirror 266 of the reflecting unit rotating in the corresponding support unit and passes through the transparent tube for reception by the graded index lens 302 of the corresponding rotor fiber, which fiber is maintained in alignment with the optical path exitting the reflecting unit by the previously-described magnetic interaction. In the embodiment as shown a signal from the central stator fiber 216 will be received by the rotor fiber 292; the signal from stator fiber 220 will be received by rotor fiber 294; and the signals from stator fibers 222, 224 and 218 will be received by rotor fibers 296, 298 and 300 respectively. Of course, signals could just as easily be transmitted in a reverse direction from the rotor fibers through the reflected paths to the stator fibers. Additionally, a combination of signal directions could be used with, say, signals passing in the rotor to stator direction along two paths and signals passing in the stator to rotor direction along the other paths. Crossing of the various signal paths during rotation of the rotor does not seriously affect the signal since the duration of such interference is infinitessimal.

While not separately illustrated it should be understood that alternative magnet configurations such as those previously described for the two-channel rotary joint could also be used in the multi-channel rotary joint of FIGS. 5 and 6.

Figure 7:
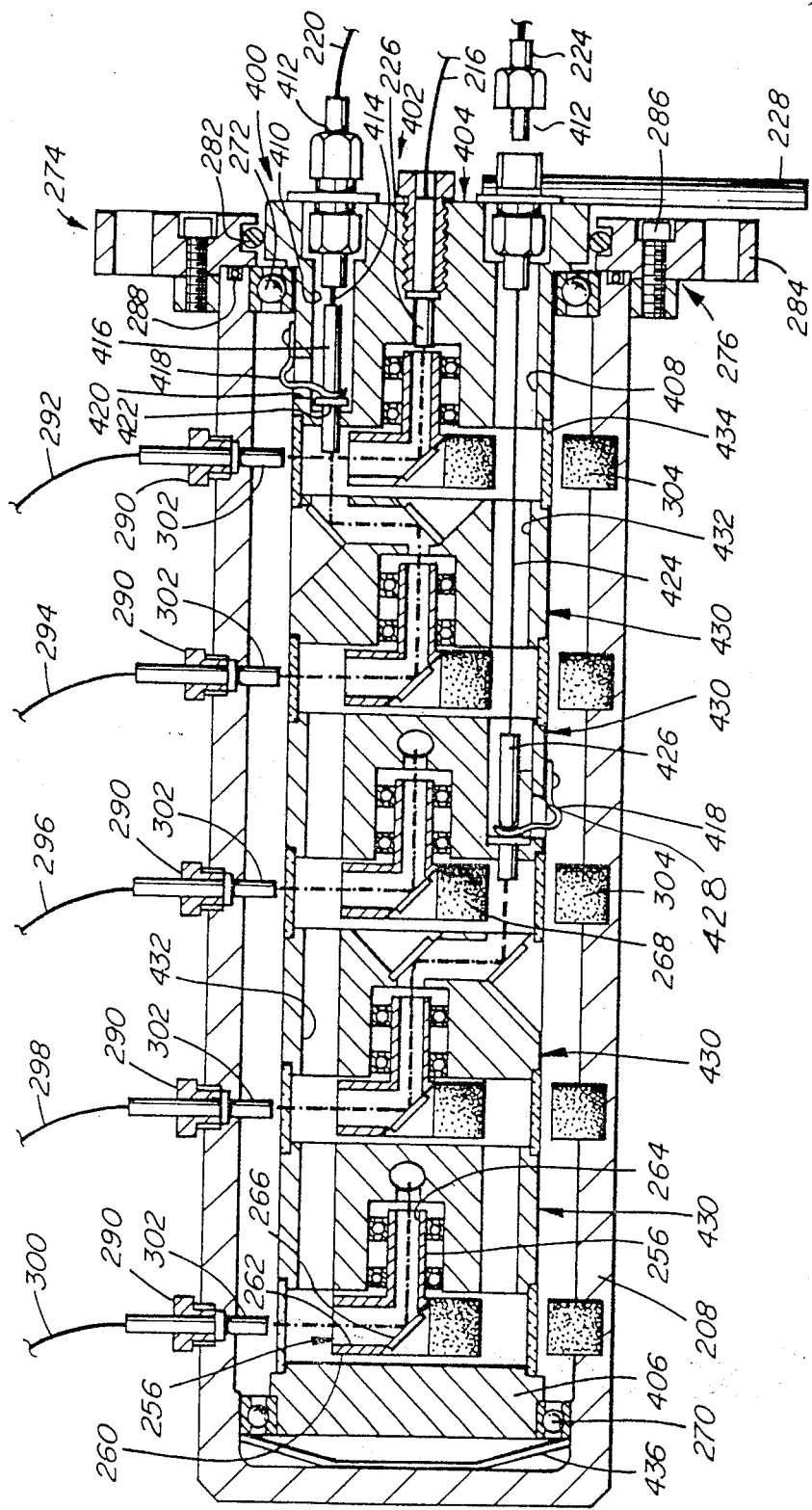
FIG. 7 illustrates a third embodiment in partial axial section of a multiple pass optical rotary joint in accordance with the present invention.
Figure 8:
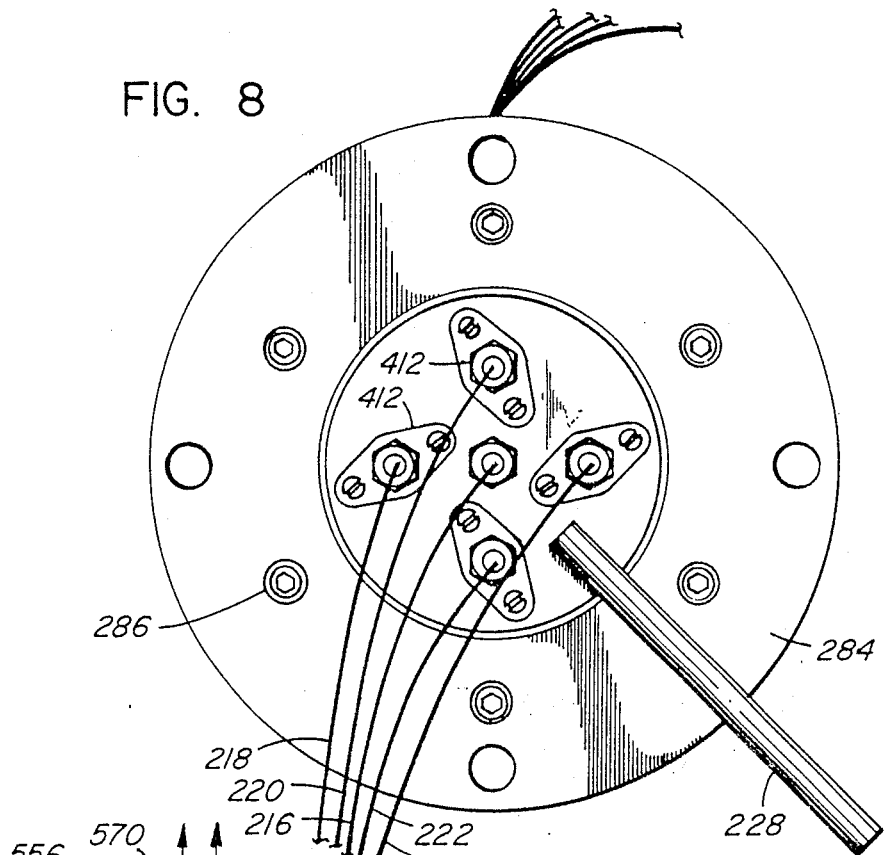
FIG. 8 is an end view of the joint of FIG. 7.
Figure 9:
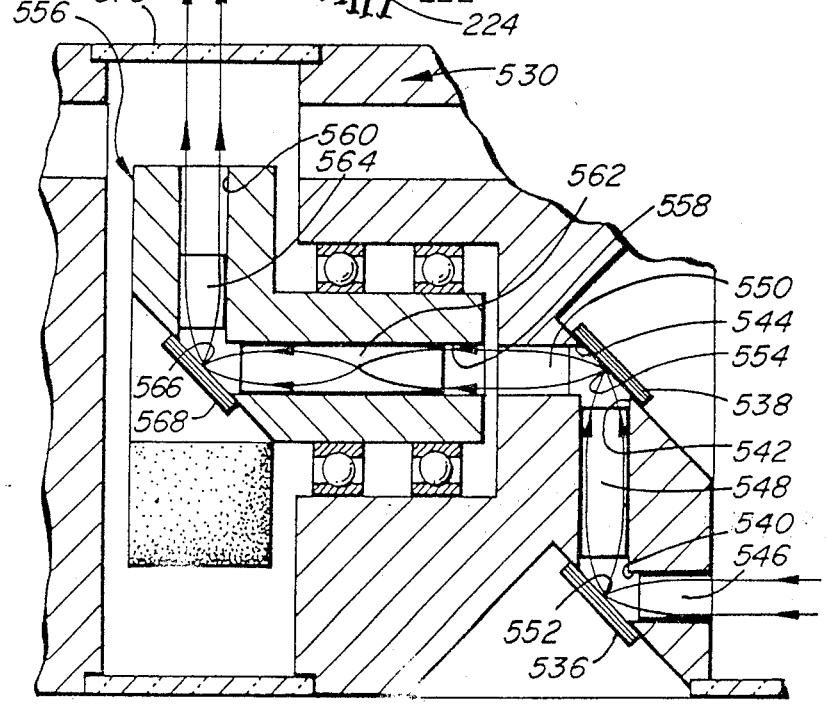
FIG. 9 is an enlarged partial section of a detail of a fourth embodiment of a multiple pass optical rotary joint in accordance with the present invention.

It is a characteristic of SELFOC lenses when used as an optical coupling that transmission losses are proportional to the distance between them. In the embodiment just described losses will be at a minimum for the coupling between fibers 216 and 292 but they will be progressively larger for each channel as the separation between lens increases. Therefore, although the number of channels which could be carried by such a rotary joint is virtually unlimited the maximum number of channels to be carried will be determined by the maximum degree of transmission losses that can be tolerated. The embodiments shown in FIGS. 7, 8 and 9 are intended to overcome the loss problem for loss-critical situations. These embodiments reduce losses by reducing the distance between the SELFOC lenses of each optical couple.

The arrangement shown in FIGS. 7 and 8 is particularly applicable for all off-axis channels such as would be carried by fibers 218–224. No change is required for the on-axis or center channel 216.

In this embodiment the rotary joint 400 includes a rotor 274 identical to that shown in FIG. 5 and accordingly the same reference numbers apply. Similarly the reflecting units 256 used within the stator 402 are identical to those of the previous embodiment and accordingly the same reference numbers apply.

The stator 402 is similar to stator 202 in that it has a head end 404 and a tail end 406, both of which resemble their counterparts in the stator 202. However in stator head end 404 three of the bores 408 receiving the off-center fibers pass through the head end and the fourth bore 410 extends deeply into the head end but terminates short of the rear face thereof. Each off-center fiber 218–224 terminates in a commercially available bulkhead termination 412 at the outer face of the head end 404. Instead of a light beam running parallel to the axis of the joint through whatever medium is within the stator it is transmitted along a bare optic fiber, one end of which terminates at the bulkhead termination 412, the other end of which terminates at a SELFOC lens contained within the stator.

Considering fiber 220 a short bare fiber 414 connects the lens 416 to the termination 412 and hence to the fiber 220. The lens 416 is held in bore 410 by a spring clip 418 which is secured at one end to the stator and has at its other end passing through an opening 420 to bear against a flange 422 on the lens, thereby biasing the lens against the bottom of bore 410. The end of lens 416 projects through a smaller diameter hole in the head end whereby the optical path from the lens 416 to the lens 302 of rotor fiber 294 is not significantly different to the path length from the on-axis lens 226 to the lens 302 of its rotor fiber 292.

Considering fiber 224 a relatively long bare fiber 424 connects the lens 426 to the termination 412 and hence to the fiber 224. The lens 426 is held in a bore 428 of the middle support unit 430 in the same manner as lens 416 is held in bore 410, that is by a spring clip 418. Since as with the previous embodiment the support units 430 have circumferentially arranged through bores 432 and since they are oriented at 90° to each other it will be possible for the bare fibers, such as 424, to pass through the appropriate bore (or bores) 432 as they pass from the head end to the lens-receiving support unit 430. In the case of fiber 224 the optical path from lens 426 to the lens 302 of rotor fiber 298 is essentially equal to the length of the optical path from lens 416 to the lens 302 of rotor fiber 294 and thus the optical or transmission losses for fibers 220 and 224 will essentially be the same.

While not specifically illustrated the fibers 218 and 222 will have axially displaced lenses associated therewith so that the optical path from each such lens to the lens 302 of the associated rotor fiber 296 and 298, respectively, will be essentially equal to the length of the just-described optical paths.

FIG. 7 shows an alternative construction which facilitates the assembly of the alternate lens arrangement illustrated therein. In this case a short length of transparent tubing 434 connects the head end 404 to the adjacent support unit 430. A similar length of tubing 434 interconnects adjacent pairs of support units 430 and the last support unit 430 to the tail end 406. The tubing lengths 434 may be positively adhered to the units 430 as by a suitable bonding agent or the entire assembly may be held together, without adhesive, through the use of a disc spring 436 positioned between the tail end 406 and the end face of the rotor, the spring 436 applying a compressive force to the stator assembly.

It should be mentioned that there will be virtually no interference caused by the bare fiber intersecting momentarily the expanded optical beam as it is projected radially from the reflecting unit 430 to the receptor lens 302. The expanded beam will have a diameter of about 0.07 inches while the bare fiber has a diameter of about 0.01 inches. Thus the area of interference is relatively small and is insignificant with respect to the operating efficiency of the joint.

FIG. 9 illustrates another improvement to the design of the light path but with increased complexity. In this embodiment the support unit 530 is similar to unit 430 and retains mirrors 536 and 538 in the same position as mirrors 250 and 254 respectively in the body of FIG. 5. However, the bores 540, 542 and 544 in the unit are much smaller than the corresponding bores 242, 244 and 246, just being large enough to accept and retain a SELFOC lens. In this case bore 540 receives a lens 546, bore 542 receives a lens 548 and bore 544 receives a lens 550. The lenses are sized and are located relative to the mirrors 536 and 538 so that the focal point 552 of the lenses 546 and 548 is coincident with that of the mirror 536 and so that the focal point 554 of the lenses 548 and 550 is coincident with that of the mirror 538.

The reflecting unit 556 has its bores 558 and 560 sized to receive SELFOC lenses 562 and 564 respectively. The focal point 566 of those lenses is coincident with that of the reflecting mirror 568.

As a result of this combination of lenses and mirrors a light beam entering the unit off-axis, as by way of lens 546 is redirected until it is on-axis and then relative rotation can take place between the supporting unit 530 and the reflecting unit 556. The on-axis expanded beam can then be redirected off-axis again through the tube 560 to a receptor SELFOC lens and the continuing optical fiber. By using adjacent closely coupled lenses as described the proportion of the light beam travelling in free space is drastically reduced and this has the effect of reducing the transmission losses.

The foregoing has described several embodiments of an optical rotary joint, each embodiment utilizing essentially the same principle of operation. It is expected that skilled practitioners in the art could effect other structures without departing from the spirit of the invention. For example, while the drawings illustrate, and the disclosure describes, mirrors as the reflecting means for the invention it is understood that other devices which serve the same purpose could be used, one such device being an appropriately dimensioned prism. Accordingly the protection to be afforded the invention is to be determined from the claims appended hereto.

The embodiments of the invention in which an exclusive property or privilege is claimed are defined as follows:

1. A multiple pass optical rotary joint comprising: a rotor and a stator each including a head end and a tail end with the rotor head and tail ends being bearingly supported by said stator head and tail ends respectively; an annular body connecting the rotor head and tail ends together and means including transparent annular tube means connecting said stator head and tail ends together, said annular body circumferentially surrounding said connecting means; first means connecting a plurality of first optical fiber means to said stator; second means connecting a plurality of corresponding second optical fiber means to said rotor; means establishing an optical signal path between each of said first fiber means and the corresponding one of said second fiber means, a portion of each optical signal path extending along the axis of the joint; rotatable optical signal reflecting means bearingly supported within said stator for reflecting at least one optical signal between axial and non-axial portions of its path for eventual reception by an appropriate one of said second fiber means; and first and second magnet means secured to said reflecting means and to said rotor, respectively, said magnet means being of opposite polarities, whereby as said rotor rotates magnetic interaction between said first and second magnet means effects synchronous rotation of said reflecting means with said rotor and maintains intact the relative angular orientation between said reflecting means and the appropriate one of said second fiber means.

2. A two pass rotary optical joint including a stator and a rotor,
(A) said stator comprising:
  (a) a head end, a tail end, and an optically transparent tube connecting said head end to said tail end;
  (b) means connecting a pair of first optical fiber members to said stator head end;
  (c) means defining a first optical signal path through said head end for each of said fiber members, a portion of a selected one of said first optical paths being coincident with the axis of said joint;
  (d) non-rotatable support means defining a through portion of the other optical path and including a central bore therein; and
  (e) reflecting means including: mutually perpendicular sections with one section being bearingly and rotatably located within the central bore of said support means, said one section having an axially extending bore therein and the other section having a generally radially extending bore therein intersecting said axially extending bore; first optical signal redirecting means positioned at the intersection of said radially and axially extending bores for redirecting an optical signal from a path along one such bore to a path along the other such bore; and first magnet means carried by said other section;
(B) said rotor comprising:
  (f) a head end, a tail end, and an annular body connecting said head end to said tail end;
  (g) means bearingly supporting said rotor head and tail ends on said stator head and tail ends respectively, said annular body circumferentially surrounding said stator transparent tube;
  (h) means connecting a pair of second optical fiber members to said rotor tail end;
  (i) means defining a second optical signal path through said rotor tail end for each of said second fiber members, a portion of one of said second optical paths being coincident with the axis of said joint; and
  (j) second magnet means carried by said rotor annular body in the same transverse plane as, and of opposite polarity to, said first magnet means;
whereby as said rotor rotates, magnetic interaction between said first and second magnet means effects synchronous rotation of said reflecting means with said rotor and maintains intact the relative angular orientation between said reflecting means and the other of said second optical paths.

3. The rotary joint of claim 2 wherein each of said first fiber members and each of said second fiber members terminates, within the stator head end and the rotor tail end respectively, with a graded index rod lens each such lens having a focal length such that the lens can collimate a light signal emitted by its adjacent fiber member into a light beam of diameter greater than that of its adjacent fiber member and such that it can focus a light beam received thereby into the end of its adjacent fiber member.

4. The rotary joint of claim 3 wherein one each of said first and second fiber members is connected to the stator and rotor respectively on the axis of said joint and the other of said first and second fiber members is connected to the stator and rotor respectively at an appropriate distance radially disposed from the axis of said joint.

5. The rotary joint of claim 4 wherein one of said first fibers members is axially displaced from the other of said first fiber members and one of said second fiber members is axially displaced from the other of said second fiber members.

6. The rotary joint of claim 5 wherein the lens connected to the on-axis first fiber member is partially located within the axially extending bore of said reflecting means.

7. The rotary joint of claim 5 wherein the other of said second optical paths includes second optical signal redirecting means adjacent the lens connected to the off-axis second fiber member for redirecting an optical signal between paths coincident with the off-axis second fiber member and the radially extending bore of said reflecting means.

8. The rotary joint of claim 7 wherein said stator tail end includes: an axially extending bore receiving the lens of said on-axis second fiber member; a radially extending bore therein; third optical signal redirecting means at the intersection of said stator tail end bores for redirecting an optical signal between a path coincident with the axial portion of said one of said second signal paths and a path extending along said stator tail end radial bore; and fourth optical signal redirecting means for redirecting an optical signal between a path extending along said stator tail end radial bore and a path coincident with the other of said first optical paths.

9. The rotary joint of claim 4 wherein said first magnet means comprises a permanent magnet secured to said other section of said reflecting means diametrically opposite said radially extending bore, and said second magnet means comprises a permanent magnet secured to said annular body, adjacent said transparent tube, and diametrically opposite the other of said second fiber members.

10. The rotary joint of claim 4 wherein said first magnet means comprises a pair of first permanent magnets of opposite polarity secured to said other section of said reflecting means, one being positioned on each side of said radially extending bore, and said second magnet means comprises a pair of second permanent magnets of opposite polarity secured to said annular body, adjacent said transparent tube, each being positioned adjacent a corresponding first magnet of opposite polarity.

11. The rotary joint of claim 4 wherein said first magnet means comprises a pair of first permanent magnets of opposite polarity secured to said other section of said reflecting means, said first magnets occupying adjacent quadrants of said other section, and said second magnet means comprises a pair of second permanent magnets of opposite polarity secured to said annular body, adjacent said transparent tube and circumferentially adjacent each other, each being positioned adjacent a corresponding first magnet of opposite polarity.

12. The rotary joint of claim 11 wherein said adjacent second magnets together define an inner curved surface which circumferentially surrounds at least 50% of the circumference of said transparent tube.

13. A multiple pass rotary optical joint including a stator and a rotor,
(A) said stator comprising:
  (a) a head end, a tail end, and an optically transparent tube connecting said head end to said tail end;
  (b) means connecting a plurality of first optical fiber members to said stator head end;
  (c) means defining an optical signal path through said head end for each of said fiber members, a portion of a selected one of said optical signal paths being coincident with the axis of said joint;
  (d) a plurality of non-rotatable support means one being adjacent said head end the others being spaced apart within said tube, each of said other support means defining through portions of the others of said optical paths; and including a central bore therein; and
  (e) reflecting means associated with each of said support means, each reflecting means including: mutually perpendicular sections with one section being bearingly and rotatably located within the central bore of its associated support means, said one section having an axially extending bore therein and the other section having a generally radially extending bore therein intersecting said axially extending bore; first optical signal redirecting means positioned at the intersection of said radially and axially extending bores for redirecting an optical signal from a path along one such bore to a path along the other such bore; and first magnet means carried by said other section;
(B) said rotor comprising:
  (f) a head end, a tail end, and an annular body connecting said rotor head end to said rotor tail end;
  (g) means bearingly supporting said rotor head and tail ends on said stator head and tail ends respectively, said rotor annular body circumferentially surrounding said stator transparent tube;
  (h) means connecting a plurality of second optical fiber members to said rotor annular body, each of said second fiber members being in the same transverse plane as an optical signal path portion defined along the radially extending bore of the reflecting means associated therewith; and
  (i) a plurality of second magnet means carried by said rotor annular body with each second magnet means being in the same transverse plane as, and of opposite polarity to, an associated one of said first magnet means;
whereby as said rotor rotates, magnetic interaction between said first and second magnet means effects synchronous rotation of each of said reflecting means with said rotor and maintains each of said second fiber members in optical alignment with the optical signal path portion defined along the radially extending bore of the reflecting means associated therewith.

14. The rotary joint of claim 13 wherein each of said first and second fiber members terminates with a graded index rod lens having a focal length such that it can collimate a light signal emitted by its adjacent fiber member into a light beam of diameter greater than that of its adjacent fiber member and such that it can focus a light beam received thereby into the end of its adjacent fiber member.

15. The rotary joint of claim 14 wherein one of said first fiber members is connected to the stator head end on the axis of said joint and the others of said first fiber members are circumferentially spaced apart and are connected off-axis to said stator head end at an appropriate distance radially disposed from the axis of said joint.

16. The rotary joint of claim 15 wherein each of said other support means includes an axially extending bore communicating with the central bore therein, a radially extending bore, second optical signal redirecting means at the intersection of said support means axial and radial bores for redirecting an optical signal between paths extending along said support means axial and radial bores, an off-axis bore parallel to said joint axis, third optical signal redirecting means at the intersection of the off-axis bore and the radial bore for redirecting an optical signal between paths extending along said support means radial and off-axis bores, each of said other support means being angularly oriented within said stator tube so that the off-axis bore thereof is optically aligned with a selected one of said off-axis first fiber members, said optical path through portions being defined by off-axis openings extending through the support means and being optically aligned with non-selected others of said off-axis first fiber members.

17. The rotary joint of claim 16 wherein said first magnet means comprises a permanent magnet secured to the other section of the reflecting means, diametrically opposite said radially extending bore thereof, and each of said second magnet means comprises a permanent magnet secured to said annular body, adjacent said transparent tube, and diametrically opposite a corresponding one of said second fiber members.

18. The rotary joint of claim 16 wherein said first magnet means comprises a pair of first permanent magnets of opposite polarity secured to the other section of the reflecting means, one being positioned on each side of the radially extending bore thereof, and each of said second magnet means comprises a pair of second permanent magnets of opposite polarity secured to said annular body, adjacent said transparent tube, each of said second magnets being positioned adjacent a corresponding first magnet of opposite polarity.

19. The rotary joint of claim 16 wherein said first magnet means comprises a pair of first permanent magnets of opposite polarity secured to the other section of the reflecting means, said first magnets occupying adjacent quadrants of the other section, and each of said second magnet means comprises a pair of permanent magnets of opposite polarity secured to said annular body, adjacent said transparent tube and circumferentially adjacent each other, each being positioned adjacent a corresponding first magnet of opposite polarity.

20. The rotary joint of claim 19 wherein said adjacent second magnets together define an inner curved surface which circumferentially surrounds at least 50% of the circumference of said transparent tube.

21. A multiple pass rotary optical joint including a stator and a rotor,
(A) said stator comprising:
 (a) a head end and a tail end;
 (b) means connecting a plurality of first optical fiber members to said head end;
 (c) means defining an optical signal path through said head end for each of said fiber members, a portion of a selected one of said optical signal paths being coincident with the axis of said joint;
 (d) a plurality of non-rotatable support means, one being adjacent said head end, and the others being axially spaced apart by a short length of annular optically transparent tubing positioned between adjacent support means and between said tail end and the support means adjacent thereto, each of said other support means defining through portions of the others of said optical paths, and including a central bore therein;
 (e) a reflecting means associated with each of said support means, each reflecting means including: mutually perpendicular sections with one section being bearingly and rotatably located within the central bore of its associated support means, said one section having an axially extending bore therein and the other section having a generally radially extending bore therein intersecting said axially extending bore; first optical signal redirecting means positioned at the intersection of said radially and axially extending bores for redirecting an optical signal from a path along one such bore to a path along the other such bore; and first magnet means carried by said other section;
(B) said rotor comprising:
 (f) a head end, a tail end and an annular body connecting said rotor head end to said rotor tail end;
 (g) means bearingly supporting said rotor head and tail ends on said stator head and tail ends respectively;
 (h) means connecting a plurality of second optical fiber members to said rotor annular body, each of said second fiber means being in the same transverse plane as an optical signal path portion defined along the radially extending bore of the reflecting means associated therewith; and
 (i) a plurality of second magnet means carried by said rotor annular body with each second magnet means being in the same transverse plane as, and of opposite polarity to, an associated one of said first magnet means;
whereby as said rotor rotates, magnetic interaction between said first and second magnet means effects synchronous rotation of each of said reflecting means with said rotor and maintains each of said second fiber members in optical alignment with the optical signal path portion defined along the radially extending bore of the reflecting means associated therewith.

22. The rotary joint of claim 21 wherein one of said first fiber members is connected to the stator head end on the axis of said joint and the others of said first fiber members are circumferentially spaced apart and are connected off-axis to said stator head end at an appropriate distance radially disposed from the axis of said joint.

23. The rotary joint of claim 22 wherein said one of said first fiber members and each of said second fiber members terminates with a graded index rod lens having a focal length such that it can collimate a light signal emitted by its adjacent fiber member into a light beam of diameter greater than that of its adjacent fiber member and such that it can focus a light beam received thereby into the end of its adjacent fiber member.

24. The rotary joint of claim 23 wherein the optical path through said stator head end for a selected one of said off-axis fiber members includes a graded index rod lens held in said head end to be closely adjacent the adjacent support means and connected to said selected off-axis fiber member by a bare optical fiber.

25. The rotary joint of claim 24 wherein each of said other support means includes an axially extending bore communicating with the central bore therein, a radially extending bore, second optical signal redirecting means at the intersection of said support means axial and radial bores for redirecting an optical signal between paths extending along said support means axial and radial bores, a first off-axis bore parallel to said joint axis, third optical signal redirecting means at the intersection of the first off-axis bore and the radial bore for redirecting an optical signal between paths extending along said support means radial and first off-axis bores, each of said other support means being angularly oriented so that the first off-axis bore thereof is optically aligned with an appropriate one of said off-axis first fiber members, all but the support means adjacent the stator tail end including a second off-axis bore for mounting therein a graded index rod lens so that it is closely adjacent the next adjacent of said support means, and all of said support means including other off-axis openings extending therethrough and providing said optical path through portions.

26. The rotary joint of claim 25 wherein the graded index rod lens mounted in each of said support means is connected to an appropriate one of the other off-axis fiber members by a bare optical fiber each passing along an appropriate one of said optical path through portions.

27. The rotary joint of claim 26 wherein each of said support means and associated reflecting means includes a graded index rod lens in each bore thereof along which an optical signal passes, said lenses each having a focal length so that the focal point thereof is coincident with the focal point of the optical signal redirecting means adjacent thereto.

28. The rotary joint of claim 26 wherein said first magnet means comprises a permanent magnet secured to the other section of the reflecting means, diametrically opposite said radially extending bore thereof, and each of said second magnet means comprises a permanent magnet secured to said annular body, adjacent said transparent tube, and diametrically opposite a corresponding one of said second fiber members.

29. The rotary joint of claim 27 wherein said first magnet means comprises a permanent magnet secured to the other section of the reflecting means, diametrically opposite said radially extending bore thereof, and each of said second magnet means comprises a permanent magnet secured to said annular body, adjacent said transparent tube, and diametrically opposite a corresponding one of said second fiber members.

30. The rotary joint of claim 26 wherein said first magnet means comprises a pair of first permanent magnets of opposite polarity secured to the other section of the reflecting means, one being positioned on each side of the radially extending bore thereof, and each of said second magnet means comprises a pair of second permanent magnets of opposite polarity secured to said annular body, adjacent said transparent tube, each of said second magnets being positioned adjacent a corresponding first magnet of opposite polarity.

31. The rotary joint of claim 27 wherein said first magnet means comprises a pair of first permanent magnets of opposite polarity secured to the other section of the reflecting means, one being positioned on each side of the radially extending bore thereof, and each of said second magnet means comprises a pair of second permanent magnets of opposite polarity secured to said annular body, adjacent said transparent tube, each of said second magnets being positioned adjacent a corresponding first magnet of opposite polarity.

32. The rotary joint of claim 26 wherein said first magnet means comprises a pair of first permanent magnets of opposite polarity secured to the other section of the reflecting means, said first magnets occupying adjacent quadrants of the other section, and each of said second magnet means comprises a pair of permanent magnets of opposite polarity secured to said annular body, adjacent said transparent tube and circumferentially adjacent each other, each being positioned adjacent a corresponding first magnet of opposite polarity.

33. The rotary joint of claim 27 wherein said first magnet means comprises a pair of first permanent magnets of opposite polarity secured to the other section of the reflecting means, said first magnets occupying adjacent quadrants of the other section, and each of said second magnet means comprises a pair of permanent magnets of opposite polarity secured to said annular body, adjacent said transparent tube and circumferentially adjacent each other, each being positioned adjacent a corresponding first magnet of opposite polarity.

* * * * *